(No Model.)
C. H. THURSTON.
WARDROBE HOOK.
No. 306,294.                     Patented Oct. 7, 1884.
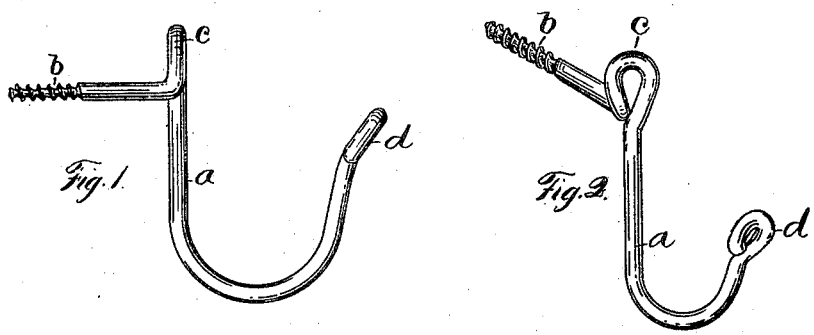
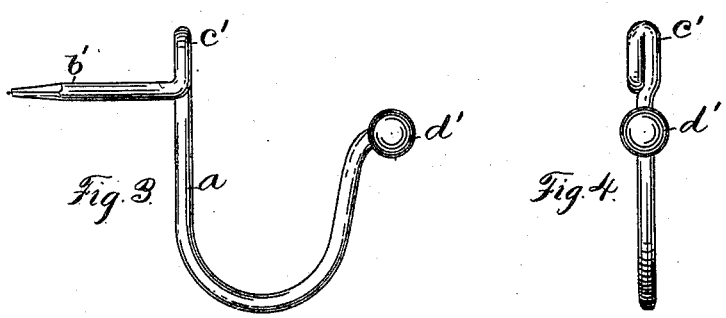
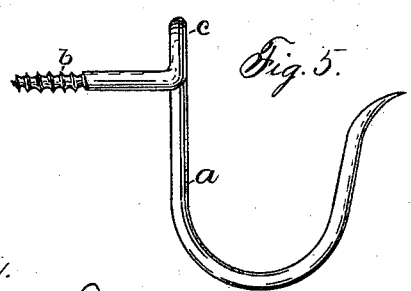
Witnesses:
John Edwards Jr.
Eddy N. Smith
Inventor:
Charles H. Thurston.
By James Shepard
Atty.

United States Patent Office.

CHARLES H. THURSTON, OF NEW BRITAIN, CONNECTICUT.

WARDROBE-HOOK.

SPECIFICATION forming part of Letters Patent No. 306,294, dated October 7, 1884.

Application filed April 30, 1884. (No model.)

*To all whom it may concern:*

Be it known that I, CHARLES H. THURSTON, a citizen of the United States, residing at New Britain, in the county of Hartford and State of Connecticut, have invented a certain new and useful Improvement in Wardrobe-Hooks, of which the following is a specification.

My invention relates to improvements in wardrobe-hooks which are formed of wire; and the objects of my invention are to cheapen the cost of production, and to so form the hook at the junction of its shank by which it is secured as to furnish a better bearing and make a stronger hook. I attain these objects by the simple construction illustrated in the accompanying drawings, in which—

Figure 1 is a side elevation of a hook which embodies my invention. Fig. 2 is a perspective view of the same. Fig. 3 is a side elevation of my hook, slightly modified in construction. Fig. 4 is a front elevation of the hook represented in Fig. 3, and Fig. 5 is a view of my hook as constructed with a sharp point for use as a letter-file or for an analogous use.

I form the body of the hook $a$ and its shank $b$ of one and the same piece of wire; but instead of bending the shank directly at right angles to the body of the hook $a$, I extend said body upward above the shank; then make a return-bend downward, as at $c$, Fig. 2, after which the shank $b$ is bent backward, as shown. This causes that part of the body of the hook which is nearest the shank to extend at right angles to the shank, both above and below the shank, whereby it is adapted for resting firmly against the wall or other object to which it is fastened, and is much better supported thereon and stronger. In case the shank is one adapted for driving, instead of being screwed into the wood, this extension, both above and below the end of the shank, furnishes a better head for striking upon in driving the shank into place.

In Figs. 3 and 4 I have represented the shank of the hook $b'$ as one adapted for being driven into the wood, and the return-bend $c'$ at the point above the shank is more abrupt and less open than that shown in Figs. 1 and 2, as is most plainly shown by comparison of Figs. 2 and 4.

Instead of the loop or eye $d$ at the outer end of the hook $a$, as shown in Figs. 1 and 2, the hook may terminate in a suitable knob or button, $d'$, as shown in Figs. 3 and 4, or, for use as a letter-file or analogous hook, with a sharp point, as shown in Fig. 5.

I claim as my invention—

The herein-described hook, with the body and shank formed in one piece of wire, and with the return-bend above the shank, whereby the portion of the hook adjacent to the shank extends both above and below said shank, substantially as described, and for the purpose specified.

CHARLES H. THURSTON.

Witnesses:
EDDY N. SMITH,
JOHN P. BARTLETT.